No. 849,202. PATENTED APR. 2, 1907.
D. S. CAPRON.
AGRICULTURAL IMPLEMENT.
APPLICATION FILED NOV. 17, 1906.
2 SHEETS—SHEET 1.
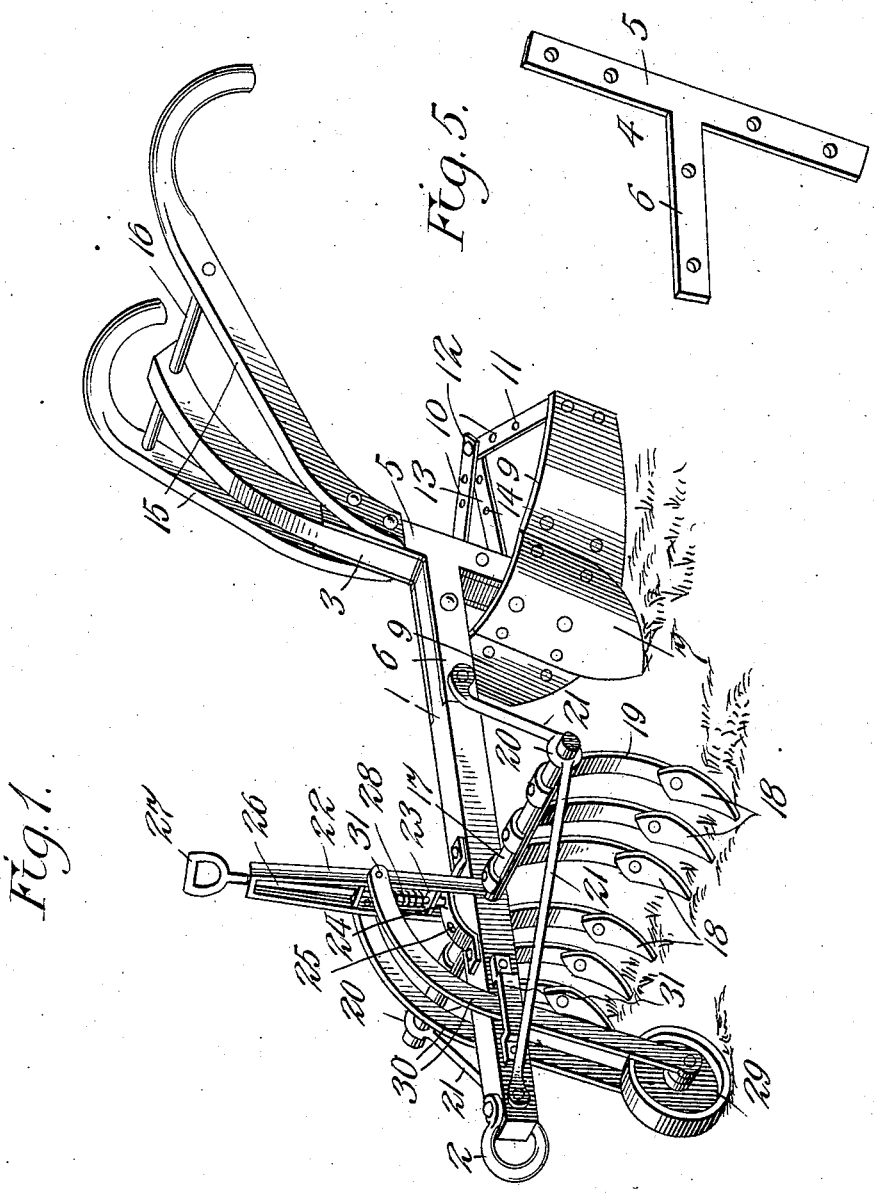
Witnesses
Inventor
Dexter S. Capron
By Victor J. Evans
Attorney

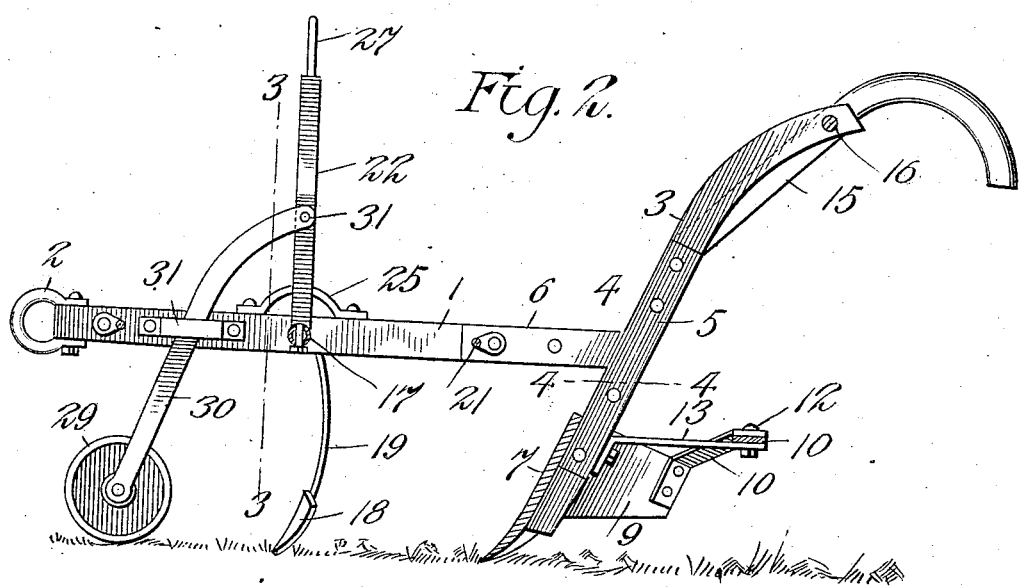
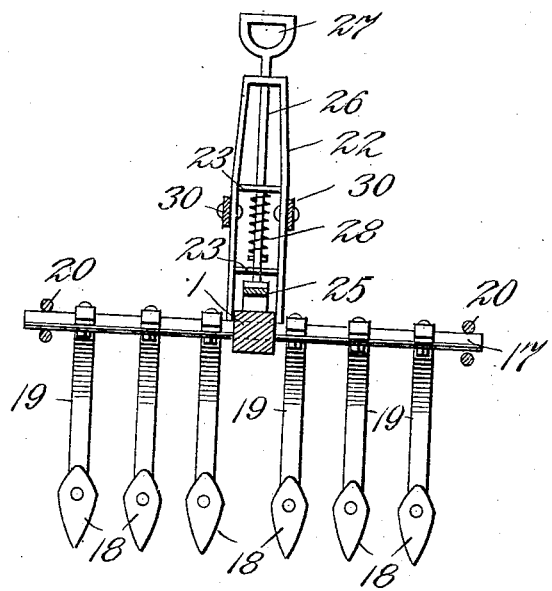
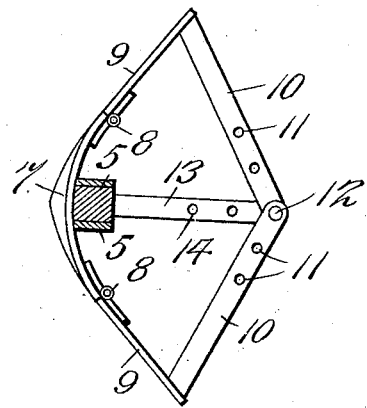

UNITED STATES PATENT OFFICE.

DEXTER S. CAPRON, OF WOODSTOCK, VERMONT.

AGRICULTURAL IMPLEMENT.

No. 849,202.  Specification of Letters Patent.  Patented April 2, 1907.

Application filed November 17, 1906. Serial No. 343,920.

*To all whom it may concern:*

Be it known that I, DEXTER S. CAPRON, a citizen of the United States of America, residing at Woodstock, in the county of Windsor and State of Vermont, have invented new and useful Improvements in Agricultural Implements, of which the following is a specification.

My invention relates to improvements in agricultural implements, and is designed to provide a simple construction of implement adapted to serve the combined function of a plow, hiller, and cultivator and which is also useful in various other similar agricultural operations.

In the accompanying drawings, Figure 1 is a perspective view of an agricultural implement embodying my invention. Fig. 2 is a side elevation of the same, with parts on the near side of the beam shown in vertical section. Fig. 3 is a vertical transverse section on line 3 3 of Fig. 2. Fig. 4 is a sectional plan view on line 4 4 of Fig. 2.

Referring to the drawings, 1 designates a beam provided at its forward end with a draft clevis or connection 2 and at its rear end with a standard 3 projecting above and below the beam, the upper end of the standard being rearwardly curved, as shown. Secured to the sides of the standards are bracket-plates 4 of approximately T form, which are also secured to the beam and rigidly fasten the standard thereto. As illustrated, the vertical cross portions 5 of the bracket-plates are bolted or otherwise fastened to the standard by bolts or other fastenings passing therethrough, while the horizontal arms 6 of said brackets are similarly connected to the beam 1, said arms being preferably let into recesses in the sides of the beam to lie flush with the outer surfaces thereof.

Fixed to the front of the depending portion of the standard is a plow-shovel 7, to the side edges of which are hinged or pivoted, as indicated at 8, hilling blades or wings 9, which extend divergently or outwardly and rearwardly when in working position to throw the soil loosened by the shovel laterally. To the outer rear ends of these blades or wings are attached the outer ends of bracing-arms 10, each provided at its inner end with a row or series or apertures 11, adapted for the reception of a connecting-bolt 12, designed to unite said arms to each other and to a rigid bracket-arm 13, extending rearwardly from the standard. The arm 13 is formed with a row or series of apertures 14, the apertures in the respective arms being so arranged as to permit of the adjustment of said arms to secure the hilling blades or wings at different angles to vary their earth-throwing action, as well as to hold them in a rearwardly folded or inoperative position, so that the shovel may be employed without the wings. It will be apparent from this construction that when the wings are folded backwardly on their hinges the shovel may be employed for ordinary plowing and that when the wings are arranged in working position the implement will be adapted for both plowing and hilling. Handles 15 are bolted at their forward ends to the standard below the upper curved portion thereof and are connected with the latter by a transverse stay-rod 16.

A rock-shaft 17 is journaled in the beam in advance of the plow and projects transversely beyond opposite sides thereof, and arranged on opposite sides of the beam and supported by the shaft are sets of cultivator-teeth 18, each suspended from the shaft by a depending curved spring-shank 19. The outer ends of the shaft are journaled in bearings 20, provided upon V-shaped braces 21, bolted at their free ends to the sides of the beam, thus firmly and securely supporting and staying the ends of the shaft from strain and deflection in any direction. The arms of a yoke-lever 22 are fixed to the shaft on opposite sides of the beam 1 and are connected and reinforced above the beam by transverse guide-pieces 23. The lever extends above the beam and is of proper length to enable sufficient power to be applied to easily rock the shaft and adjust the supporting-wheels hereinafter described. Fixed to the beam so as to extend longitudinally between the arms of the lever is an arched locking or rack plate 24, formed with receiving or keeper openings, preferably three in number, arranged, respectively, at the center and in front and rear thereof. A rod 26 is fitted to slide in the upper end of the lever and crosspieces 23 and is provided at its upper end with an operating-handle 27. The lower end of this rod forms a pawl or dog to engage the openings 25, and a coiled spring 28 is arranged about the rod in any suitable manner to force the same normally downward into locking engagement with the rack, the upper end of the spring being preferably free from connection with the rod and arranged to bear against the upper cross-piece 23, while the lower end thereof is fastened to the rod, so that the spring will exert its expansive energy to force the rod downward.

A supporting wheel or roller 29 is arranged in advance of the cultivator-teeth and is journaled in the lower end of a carrying-frame comprising a pair of parallel bars 30, arranged to slide vertically at 31 on the sides of the beam and having their upper ends rearwardly curved and pivotally connected to the arms of the lever, as at 31. The construction and arrangement of these parts is such that when the lever is thrown rearwardly to engage the dog with the rearmost opening in the rack-plate the shaft will be rocked to throw the cultivator-teeth to work at a forward angle, while the supporting wheel or roller will be elevated above the surface of the ground. When the lever is in a vertical or intermediate position and the locking-dog is engaged with the central opening in the rack, the teeth will be arranged in a vertical working position and the roller brought to run upon the ground-surface. When the lever is thrown forwardly and the dog engaged with the foremost opening 25, the shaft will be rocked rearwardly to elevate and throw the cultivator-teeth out of working position, while the roller will be held in contact with the ground and the front portion of the beam 1 elevated on the carrier-frame 30. By this means the cultivator-teeth and supporting wheel or roller may be arranged for operation to suit different conditions of service, and the wheel alone may be maintained in contact with the ground-surface, so that by tilting the rear portion of the implement upwardly to raise the shovel 7 from the ground the device may be run upon the roller for convenient transportation from point to point without interference from the earth-working elements.

It will be apparent to those versed in the art that an agricultural implement constructed in the manner described may be used for plowing and cultivating, plowing and hilling, and any combination of these operations, and thus will be found of manifold convenience to agriculturists.

Having thus described the invention, what is claimed as new is—

1. An agricultural implement comprising a frame, a transverse row of cultivator-teeth carried thereby, a ground-wheel arranged in advance of the cultivator-teeth, and means for simultaneously adjusting said teeth and wheel to position the same for different operations.

2. An agricultural implement comprising a frame, a transverse rock-shaft journaled thereon, a transverse row of cultivator-teeth carried by the shaft, a ground-wheel arranged in advance of the shaft, and means for simultaneously rocking said shaft and adjusting the wheel to position the teeth and wheel for different operations.

3. An agricultural implement comprising a frame, a transverse shaft journaled thereon, a transverse row of cultivator-teeth carried by the shaft, a lever for rocking the shaft, a ground-wheel arranged in advance of the shaft, a connection between said wheel and lever, whereby the shaft and wheel may be simultaneously adjusted to position the wheel and teeth for different operations, and locking means for holding the lever in adjusted position.

4. An agricultural implement comprising a frame, a transverse rock-shaft journaled thereon, a transverse row of cultivator-teeth carried by said shaft, a ground-wheel arranged in advance of the cultivator-teeth, a frame carrying said wheel and vertically adjustable on the main frame, and an adjusting-lever connected with the rock-shaft and pivoted to said carrying-frame, whereby the cultivator-teeth and wheel may be adjusted for a variety of operations.

5. An agricultural implement comprising a frame, bearing members on opposite sides of the frame, a transverse shaft journaled centrally in the frame and terminally in said bearing members, transverse rows of cultivator-teeth arranged on opposite sides of the frame and carried by said shaft, a lever for rocking the shaft, a ground-wheel arranged in advance of the teeth, a frame carrying said wheel and slidably mounted on the frame, said frame being pivotally connected with the lever, and means for locking the lever in adjusted position.

In testimony whereof I affix my signature in presence of two witnesses.

DEXTER S. CAPRON.

Witnesses:
KARL A. PENBER,
FREDERICK C. SOUTHGATE.